(12) United States Patent
Furusawa

(10) Patent No.: US 8,330,896 B2
(45) Date of Patent: Dec. 11, 2012

(54) LIQUID CRYSTAL DISPLAY DEVICE

(75) Inventor: Yasuhiro Furusawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 114 days.

(21) Appl. No.: 13/001,448

(22) PCT Filed: Apr. 8, 2009

(86) PCT No.: PCT/JP2009/057201
§ 371 (c)(1),
(2), (4) Date: Dec. 27, 2010

(87) PCT Pub. No.: WO2010/001649
PCT Pub. Date: Jan. 7, 2010

(65) Prior Publication Data
US 2011/0109842 A1    May 12, 2011

(30) Foreign Application Priority Data

Jul. 4, 2008 (JP) ................. 2008-176210

(51) Int. Cl.
G02F 1/1335 (2006.01)
G02B 5/02 (2006.01)
(52) U.S. Cl. .............. 349/64; 349/61; 349/70; 362/561; 362/558
(58) Field of Classification Search .............. 349/70, 349/64, 61; 362/558, 561
See application file for complete search history.

(56) References Cited

U.S. PATENT DOCUMENTS

| 6,095,656 | A | 8/2000 | Shimura et al. | |
| 2004/0027512 | A1* | 2/2004 | Kubomura et al. | 349/65 |
| 2006/0139952 | A1* | 6/2006 | Inoue et al. | 362/613 |
| 2007/0086181 | A1* | 4/2007 | Hatanaka et al. | 362/97 |

FOREIGN PATENT DOCUMENTS

| JP | 11-96822 A | 4/1999 |
| JP | 2007-87657 A | 4/2007 |
| JP | 2007-264343 A | 10/2007 |

OTHER PUBLICATIONS

Official Communication issued in International Patent Application No. PCT/JP2009/057201, mailed on Jul. 21, 2009.

* cited by examiner

Primary Examiner — Wen-Ying P Chen
(74) Attorney, Agent, or Firm — Keating & Bennett, LLP

(57) ABSTRACT

A liquid crystal display device of the present invention includes a liquid crystal display panel and a backlight for radiating light to the liquid crystal display panel. The backlight includes a hot-cathode tube (linear light source) (21) and ends (21b) of an outer shape of the hot-cathode tube (21) are positioned inside a display region (R1) of the liquid crystal display panel when the liquid crystal display device is seen from a side where an image is displayed, and the hot-cathode tube (21) is positioned to cross a center line (C) of the display region (R1) in a longitudinal direction.

7 Claims, 11 Drawing Sheets

LIQUID CRYSTAL DISPLAY DEVICE

TECHNICAL FIELD

The present invention relates to a liquid crystal display device including a liquid crystal display panel and a backlight for radiating light to the liquid crystal display panel.

BACKGROUND ART

Recently, liquid crystal display devices have rapidly spread in substitution for cathode-ray tubes (CRT) and have been widely used for liquid crystal televisions, monitors, mobile phones etc. by taking advantages of characteristics of the liquid crystal display devices, such as low energy consumption, flat size, light weight etc. One option for further taking advantage of such characteristics is improvement of an illuminating device (so-called backlight) provided behind a liquid crystal display device.

Illuminating devices are broadly classified into a side light type (also referred to as edge light type) and a direct light type. Among them, the direct light type illuminating device has a plurality of light sources such as cold-cathode tubes behind a liquid crystal display panel and directly illuminates the liquid crystal display panel. Accordingly, the direct light type illuminating device allows obtaining high luminance even for a large screen, and therefore is used mainly for a large liquid crystal display having a 20 inch or more size.

One example of the direct light type illuminating devices is disclosed in Patent Literature 1. In the illuminating unit in Patent Literature 1, a straight-tube light source (linear light source) having electrodes at its both ends is used as a light source. A backlight using such a linear light source is designed such that both ends of the outer shape of the linear light source are positioned at the outside of a region where images are displayed in a liquid crystal display panel (which region is referred to as effective display region) (see FIG. 3 of Patent Literature 1 for example).

This configuration is explained below with reference to drawings.

(a) and (b) of FIG. 14 show an example of a configuration of a liquid crystal display device whose backlight is a conventional direct light type illuminating device using a linear light source such as a cold-cathode tube. A liquid crystal display device 100 shown in FIG. 14 includes a liquid crystal display panel 101 and a backlight 102 for radiating light to the liquid crystal display panel 101. The backlight 102 includes a plurality of cold-cathode tubes (linear light sources) 111, a reflective plate 112, and a diffusing plate 113.

As shown in (a) of FIG. 14, there are provided a plurality of cold-cathode tubes 111, which are aligned along a horizontal direction (lateral direction) d1 in such a manner that the cold-cathode tubes 111 are parallel to each other. The reflective plate 112 is positioned at the back face of the cold-cathode tubes 111 (positioned oppositely to a side of the cold-cathode tubes 111 which side faces the liquid crystal display panel 101), and reflects the light from the cold-cathode tubes 111 so that the light is directed toward the liquid crystal display panel 101. The diffusing plate 113 diffuses the light from the cold-cathode tubes 111 so that the light is directed toward the liquid crystal display panel 101.

(a) of FIG. 14 shows a relationship between a width a of an effective display region of the liquid crystal display panel 101 and a length b in a long side direction of the cold-cathode tube 111. Here, the effective display region of the liquid crystal display panel 101 indicates a region obtained by removing, from a whole region of the liquid crystal display panel 101, a peripheral region (frame region) where drive circuits for driving various lines and other components are provided. The length b in a long side direction of the cold-cathode tube 111 indicates a length in a long side direction from one end of the outer shape of the cold-cathode tube 111 serving as a linear light source to the other end thereof.

As shown in (a) of FIG. 14, in the conventional liquid crystal display device 100, each end of the cold-cathode tube 111 is positioned at the outside of the effective display region. That is, the effective display region is included in an area defined by the length b of the cold-cathode tube 111.

In the example shown in (a) of FIG. 14, an explanation was made as to a configuration in which the cold-cathode tubes 111 are positioned along a lateral direction of the liquid crystal display panel 101. It should be noted that in a configuration in which the cold-cathode tubes 111 are positioned along a longitudinal direction of the liquid crystal display panel 101, a relationship between a width of an effective display region of the liquid crystal display panel 101 and a length in a long side direction of the cold-cathode tube 111 is the same as that in the case of the configuration in which the cold-cathode tubes 111 are positioned along a lateral direction of the liquid crystal display panel 101.

CITATION LIST

Patent Literature

[Patent Literature 1]
Japanese Patent Application Publication, Tokukai, No. 2007-87657 (published on Apr. 5, 2007)

SUMMARY OF INVENTION

Recently, amidst growing awareness of global environment conservation, there is requested development of environment-friendly display devices. In order to realize such environment-friendly display devices, it is necessary to reduce power consumption and the number of components. However, use of an existing direct light illuminating device as above for a backlight of a liquid crystal display device requires large power consumption of a linear light source, making it difficult to reduce power consumption of the liquid crystal display device as a whole.

The present invention was made in view of the foregoing problem. An object of the present invention is to provide a liquid crystal display device with reduced power consumption without reducing luminance of a backlight.

In order to solve the foregoing problem, a liquid crystal display device of the present invention includes a liquid crystal display panel and a backlight for radiating light to the liquid crystal display panel, the backlight including a linear light source, and ends of an outer shape of the linear light source being positioned inside a display region of the liquid crystal display panel when the liquid crystal display device is seen from a side where an image is displayed, and the linear light source being positioned to cross at least one of a center line of the display region in a longitudinal direction and a center line of the display region in a horizontal direction.

With the arrangement, by determining the length of the linear light source in a long side direction in such a manner that ends of the linear light source are inside the display region, it is possible to make the length of the light source shorter than that of a light source in a conventional configuration. Shorter length of the linear light source in a long side direction enables a tube voltage to be decreased while keeping the same tube current. This allows reducing power consumption for the linear light source.

In the arrangement, the center line of the liquid crystal display panel in a longitudinal direction indicates a center line which passes through the center of the display region of the liquid crystal display panel and which extends in an up-down direction (vertical direction) when seen from a viewer. Further, the center line of the liquid crystal display panel in a horizontal direction indicates a center line which passes through the center of the display region of the liquid crystal display panel and which extends in an lateral direction (horizontal direction) when seen from a viewer.

With the arrangement, the linear light source is positioned to cross at least one of a center line of the display region in a longitudinal direction and a center line of the display region in a horizontal direction. This allows radiating a sufficient amount of light to the center portion of the display region, realizing higher use efficiency of light than that in a case of radiating light to an end of the display region.

Consequently, with the arrangement, it is possible to realize a liquid crystal display device with reduced power consumption without decreasing luminance of an illuminating device.

In the backlight of the liquid crystal display device, only one linear light source may be provided or a plurality of linear light sources may be provided. In a case where only one linear light source is provided, it is preferable that the linear light source is positioned at a center portion of the display region (that is, at a position corresponding to the center line of the display region). Further, in a case where a plurality of linear light sources are provided, it is preferable that the linear light sources are positioned to be along a longitudinal direction (vertical direction) or a lateral direction (horizontal direction) of the liquid crystal display panel and to be parallel to each other. This configuration allows reducing luminance patches throughout the display region.

In the backlight of the liquid crystal display device of the present invention, at least one of the ends of the outer shape of the linear light source is required to be inside the display region of the liquid crystal display panel when the liquid crystal display device is seen from a side where an image is displayed. It is more preferable that both of the ends of the outer shape of the linear light source is inside the display region of the liquid crystal display panel.

With the arrangement, since both of the ends of the linear light source is equally positioned inside the display region, light from the linear light source is equally radiated to the liquid crystal display panel, thereby further uniforming luminance, and use efficiency of light can be increased.

It is preferable to arrange the liquid crystal display device of the present invention such that the backlight includes a transmittance changing section, provided between the liquid crystal display panel and the linear light source, for changing transmittance of incident light according to where the light is incident, the transmittance changing section being designed such that the transmittance is higher as a distance between the transmittance changing section and the linear light source is longer.

With the arrangement, it is possible to reduce a difference in luminance between the ends of the display region which are positioned outside the ends of the linear light source and the center portion of the display region, thereby reducing luminance patches caused by a difference in a distance from the linear light source. This allows uniforming luminance of the backlight.

It is preferable to arrange the liquid crystal display device of the present invention such that the transmittance changing section is further designed such that an area positioned outside of the ends of the outer shape of the linear light source in a long side direction has higher transmittance than an area where the linear light source is positioned.

With the arrangement, it is possible to reduce a difference in luminance between the ends of the display region which are positioned outside the ends of the linear light source and the center portion of the display region, thereby reducing luminance patches caused by a difference in a distance from the linear light source. This allows uniforming luminance of the backlight.

It is preferable that the transmittance of the transmittance changing section is changed in such a manner that in accordance with light and dark patches appearing near ends of the linear light source (that is, at ends of the display region in a long side direction of the linear light source), transmittance of a dark portion is set higher than transmittance of a light portion. This enables the light and dark patches appearing at the ends of the display region to be less distinctive.

It is preferable to arrange the liquid crystal display device of the present invention such that the backlight includes a diffusing plate, provided between the liquid crystal display panel and the linear light source, for diffusing light, a face of the diffusing plate which face faces the linear light source has been subjected to a diffusing treatment for diffusing light, and the face of the diffusing plate has been subjected to the diffusing treatment in such a manner that a portion of the face which portion faces the ends of the linear light source has lower diffusibility than a portion of the face which portion faces a center portion of the linear light source.

With the arrangement, it is possible to reduce a difference in luminance between the ends of the display region which are positioned outside the ends of the linear light source and the center portion of the display region, thereby reducing luminance patches caused by a difference in a distance from the linear light source. This allows uniforming luminance of the backlight.

It is preferable that the diffusibility of the transmittance changing section is changed in such a manner that in accordance with light and dark patches appearing near ends of the linear light source (that is, at ends of the display region in a long side direction of the linear light source), diffusibility of a dark portion is set higher than diffusibility of a light portion. This enables the light and dark patches appearing at the ends of the display region to be less distinctive.

Examples of the diffusing treatment include a treatment for making minute concavities and convexities (grain finish), dot pattern printing, and a prism treatment. In a case where the diffusing treatment is a treatment for making minute concavities and convexities (grain finish) or dot pattern printing, diffusibility given by the diffusing treatment is determined by proportion of area occupied by concavities and convexities or dots in the concavity and convexity pattern or the dot pattern.

It is preferable to arrange the liquid crystal display device of the present invention such that the backlight includes a reflective plate, provided at a back face of the linear light source, for reflecting light, a face of the reflective plate which face faces the linear light source has been subjected to a diffusing treatment for diffusing light, the face of the reflective plate has been subjected to the diffusing treatment in such a manner that a portion of the face which portion faces the ends of the linear light source has lower diffusibility than a portion of the face which portion faces a center portion of the linear light source.

Here, the back face of the linear light source is a face opposite to a face facing the liquid crystal display panel. The back face of the linear light source may be expressed as a face opposite to a light-radiating face of the backlight. In a case where the backlight has a containing section, the back face of the linear light source corresponds to a bottom surface (light-source-provided surface) of the containing section.

With the arrangement, it is possible to reduce a difference in luminance between the ends of the display region which are positioned outside the ends of the linear light source and the center portion of the display region, thereby uniforming luminance of the backlight.

Examples of the diffusing treatment include a treatment for making minute concavities and convexities (grain finish), dot pattern printing, and a prism treatment. In a case where the diffusing treatment is a treatment for making minute concavities and convexities (grain finish) or dot pattern printing, diffusibility given by the diffusing treatment is determined by proportion of area occupied by concavities and convexities or dots in the concavity and convexity pattern or the dot pattern.

It is preferable to arrange the liquid crystal display device of the present invention such that the backlight includes a containing section for containing the linear light source, and a size of a face of the containing section on which face a light source is provided is determined in accordance the outer shape of the linear light source, a size of a face of the containing section which face faces the liquid crystal display panel is determined in accordance with an outer shape of the liquid crystal display panel, and a side face of the containing section which side face is positioned between the face on which the light source is provided and the face facing the liquid crystal display panel is inclined with respect to the face on which the light source is provided and the face facing the liquid crystal display panel.

With the arrangement, the containing section shows a trapezoidal cross section when seen from an up-down direction and a lateral direction of the display region. That is, the containing section is shaped in such a manner that the area of a cross section of the containing section seen from the side where an image is displayed increases as the cross section starts from the face where the light source is provided (i.e. bottom surface of the containing section) to the face facing the liquid crystal display panel (or a face facing another plate member, if such plate member (e.g. the diffusing plate) is provided between the liquid crystal display panel and the containing section).

In the containing section in which the linear light source is provided, light from the linear light source is diffused and reflected plural times. With the arrangement, by designing the containing section in such a manner that the shape of the bottom surface of the containing section where the linear light source is provided is determined in accordance with the outer shape of the linear light source and the side face of the containing section is inclined from the bottom face to the face facing the liquid crystal display panel, it is possible to increase a diffusing function and a reflective function in the containing section. This allows increasing luminance of a backlight.

It is preferable to arrange the liquid crystal display device of the present invention such that the linear light source is a hot-cathode tube.

With the arrangement, the hot-cathode tube has larger luminous flux with respect to power consumption than other linear light source such as a cold-cathode tube and has higher luminous area. This allows further reducing power consumption without reducing luminance of the backlight.

For a fuller understanding of other objects, nature and advantages of the invention, reference should be made to the ensuing detailed description taken in conjunction with the accompanying drawings.

Figure 4:
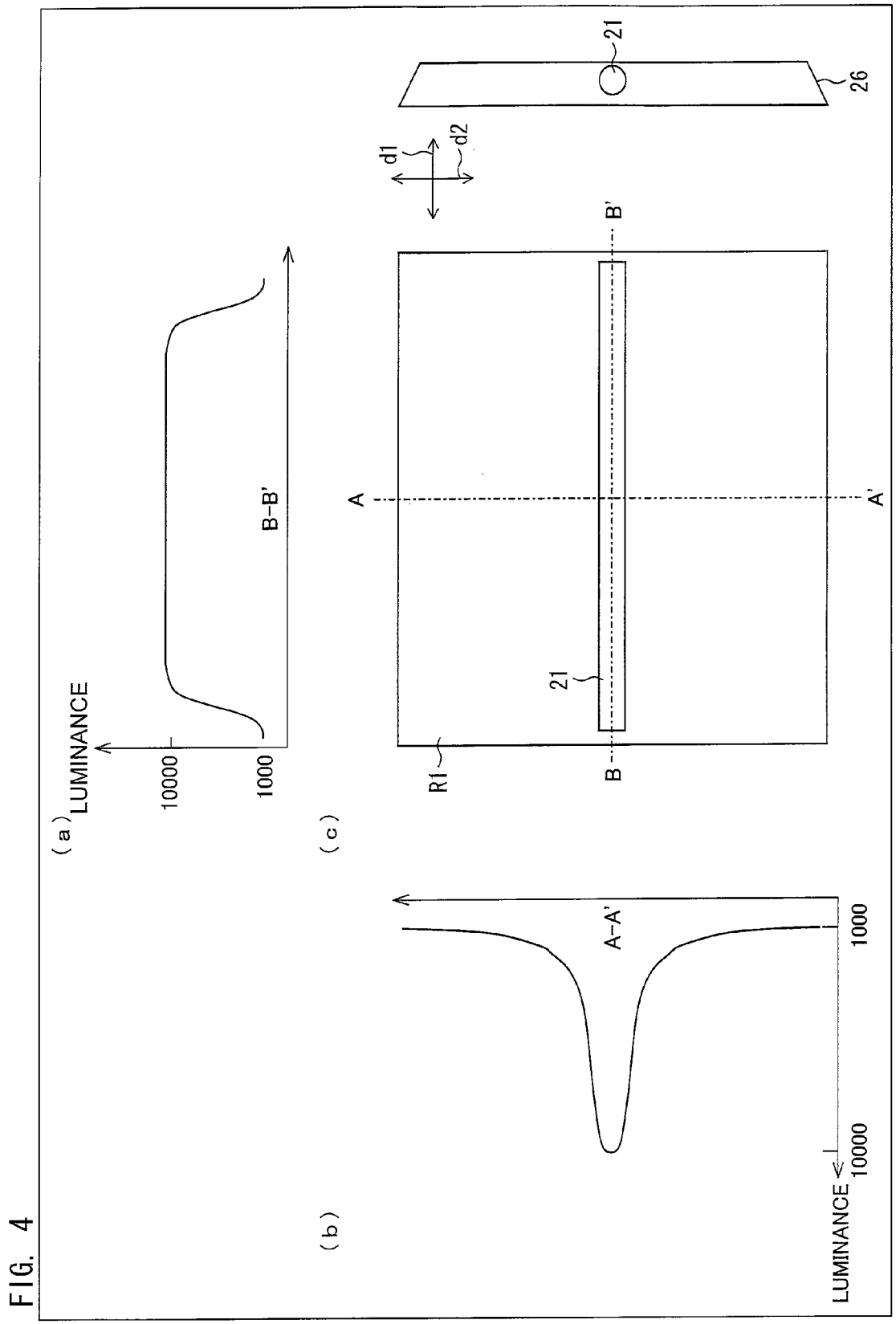

(a) of FIG. 4 is a graph showing a change in luminance of a hot-cathode tube taken along a line B-B' of (c) of FIG. 4. (b) of FIG. 4 is a graph showing a change in luminance of a hot-cathode tube taken along a line A-A' of (c) of FIG. 4. (c) of FIG. 4 is a drawing schematically showing a positional relationship between the display region and the hot-cathode tube in the liquid crystal display device shown in FIG. 2.

Figure 5:
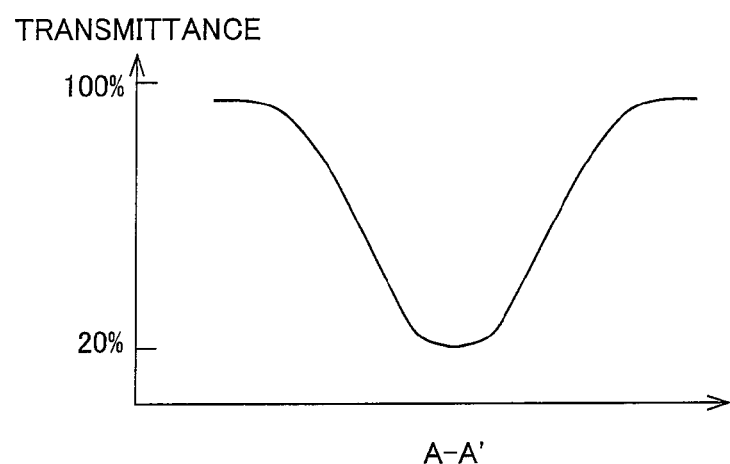

FIG. 5 is a drawing showing an example of a change in transmittance of a transmittance changing sheet taken along the line A-A' of (c) of FIG. 4.

Figure 6:
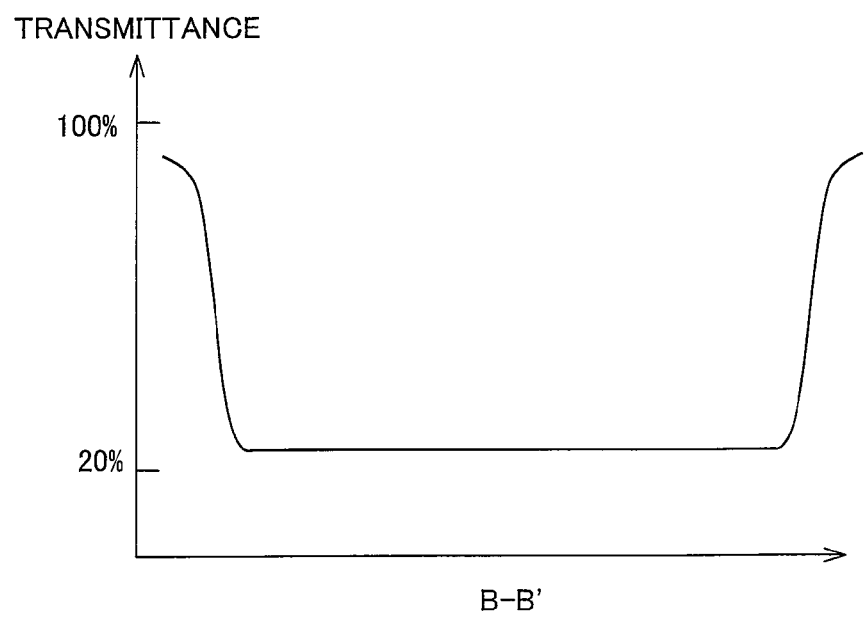

FIG. 6 is a drawing showing an example of a change in transmittance of the transmittance changing sheet taken along the line B-B' of (c) of FIG. 4.

Figure 2:
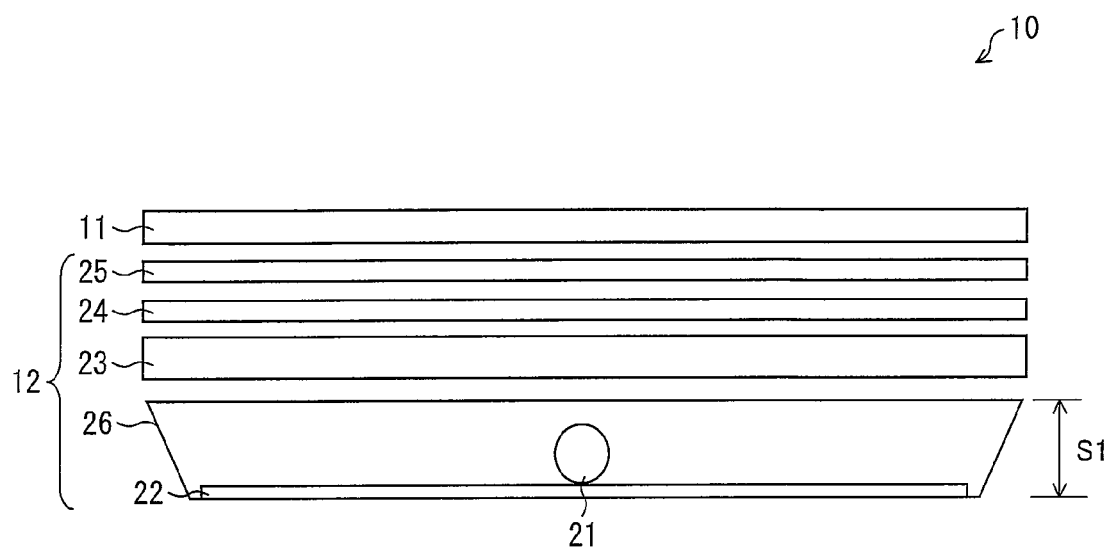
FIG. 2 is a cross sectional drawing showing a configuration of a liquid crystal display device in accordance with Embodiment 1 of the present invention.
Figure 7:
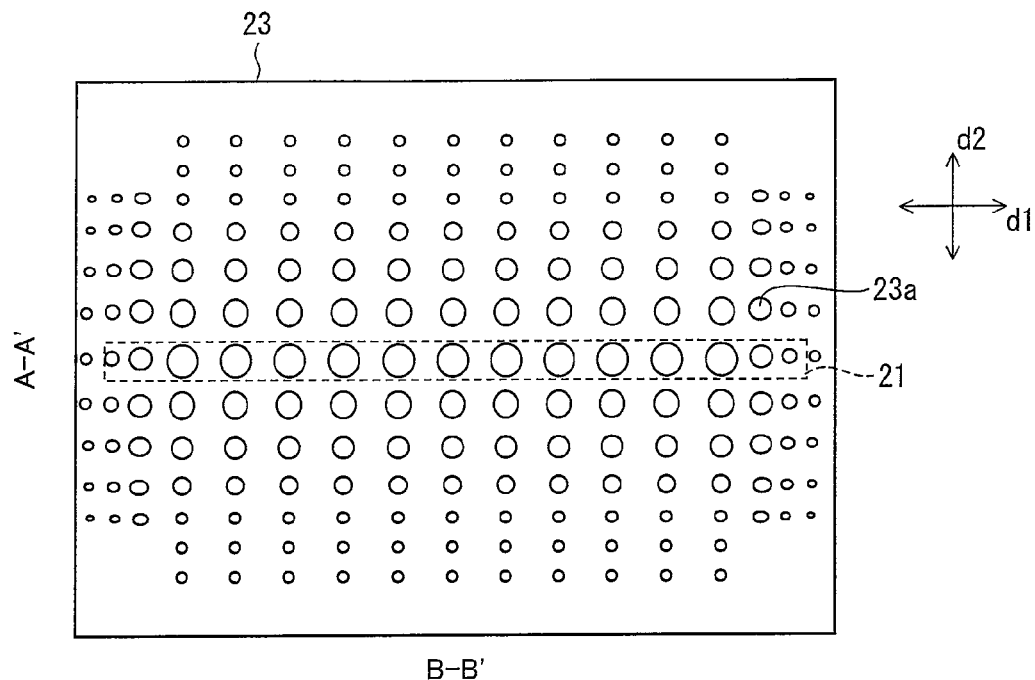

FIG. 7 is a drawing schematically showing a configuration of a diffusing plate included in a backlight of the liquid crystal display device shown in FIG. 2.

Figure 8:
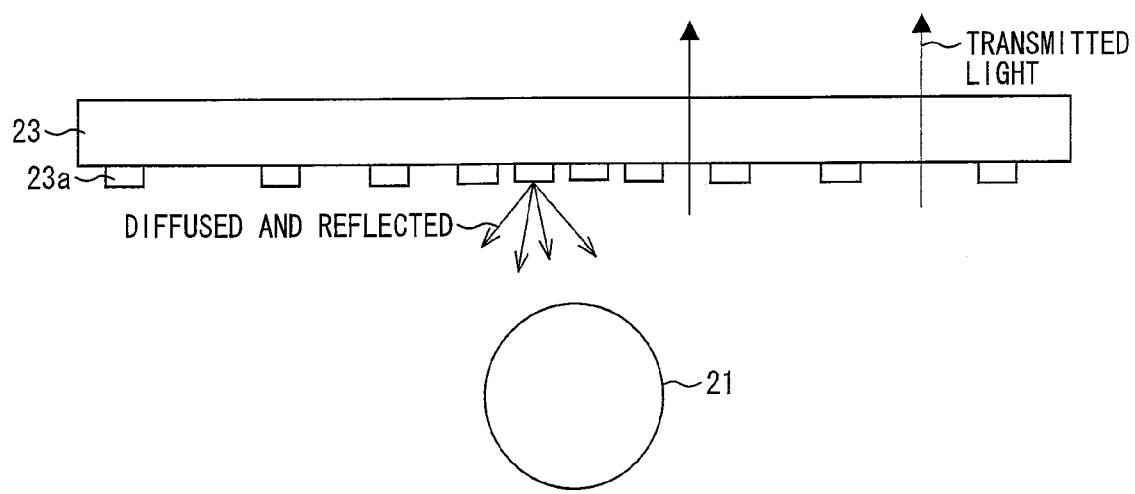

FIG. 8 is a drawing schematically showing a relationship between an amount of a diffusing material applied on the back face of the diffusing plate shown in FIG. 7 and a manner in which light from a hot-cathode tube travels.

Figure 9:
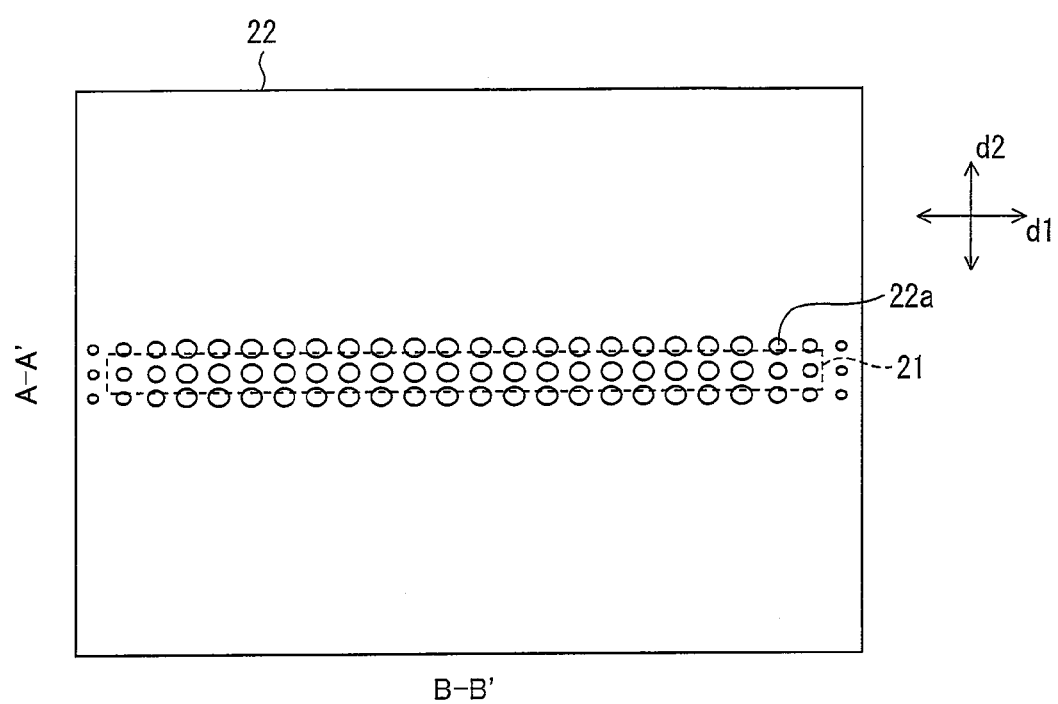

FIG. 9 is a drawing schematically showing a configuration of a reflective plate included in the liquid crystal display device shown in FIG. 2.

Figure 10:
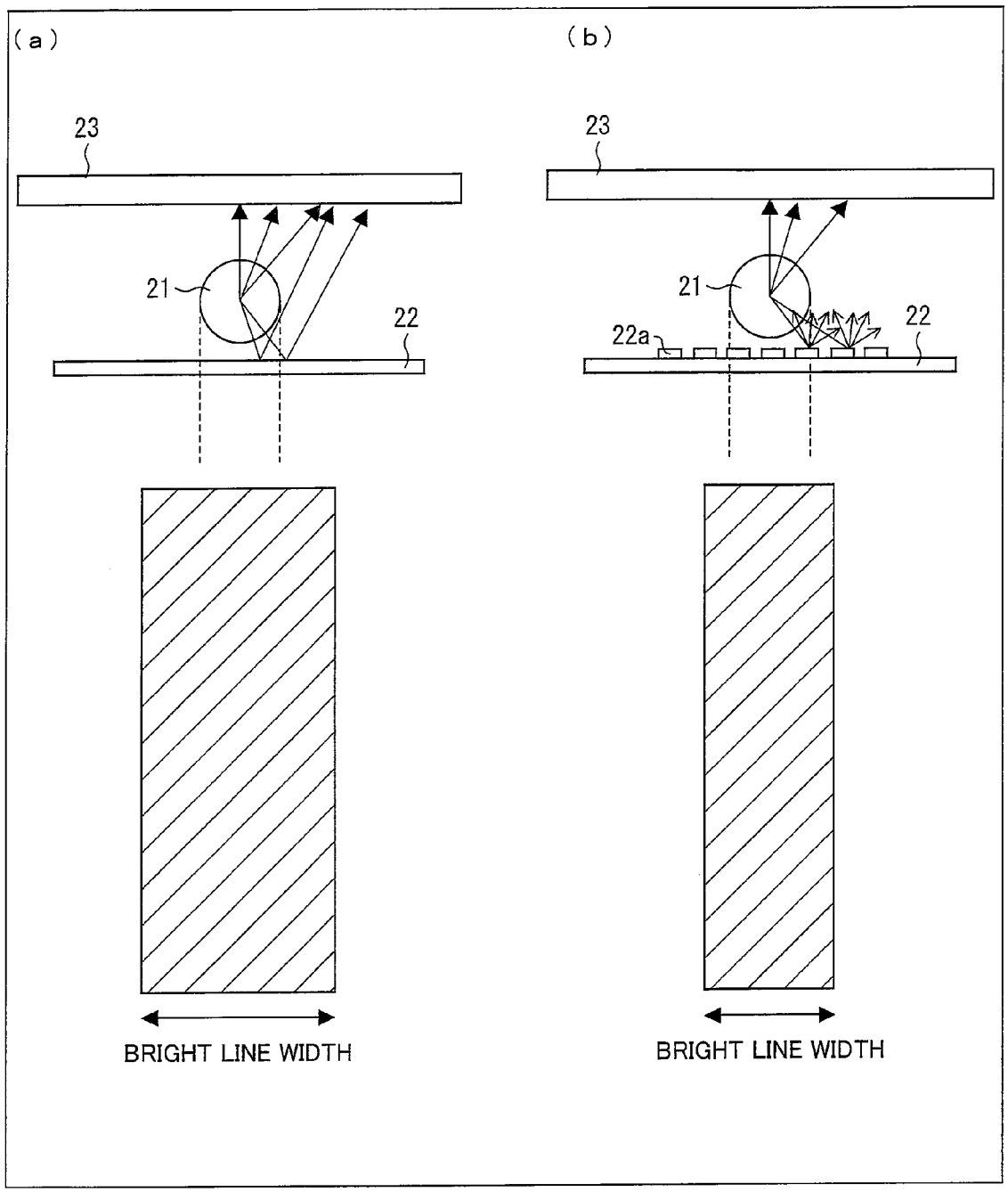

(a) of FIG. 10 is a drawing schematically showing a manner in which light from a linear light source travels in a case where a reflective plate of a backlight has not been subjected to a diffusing treatment, and also showing a width of a bright line appearing on a diffusing plate in that case. (b) of FIG. 10 is a drawing schematically showing a manner in which light from a linear light source travels in a case where a reflective plate of a backlight has been subjected to a diffusing treatment, and also showing a width of a bright line appearing on a diffusing plate in that case.

Figure 11:
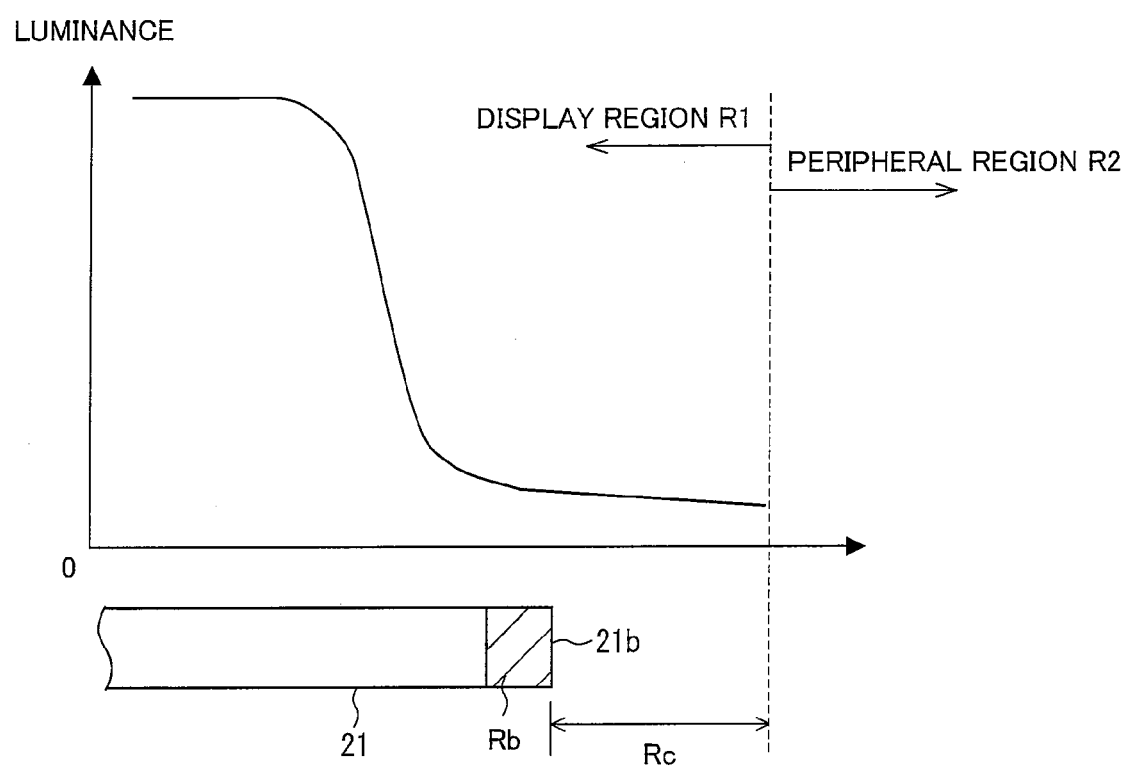

FIG. 11 is a drawing schematically showing a change in luminance of one end of a tubular light source in a long side direction.

Figure 12:
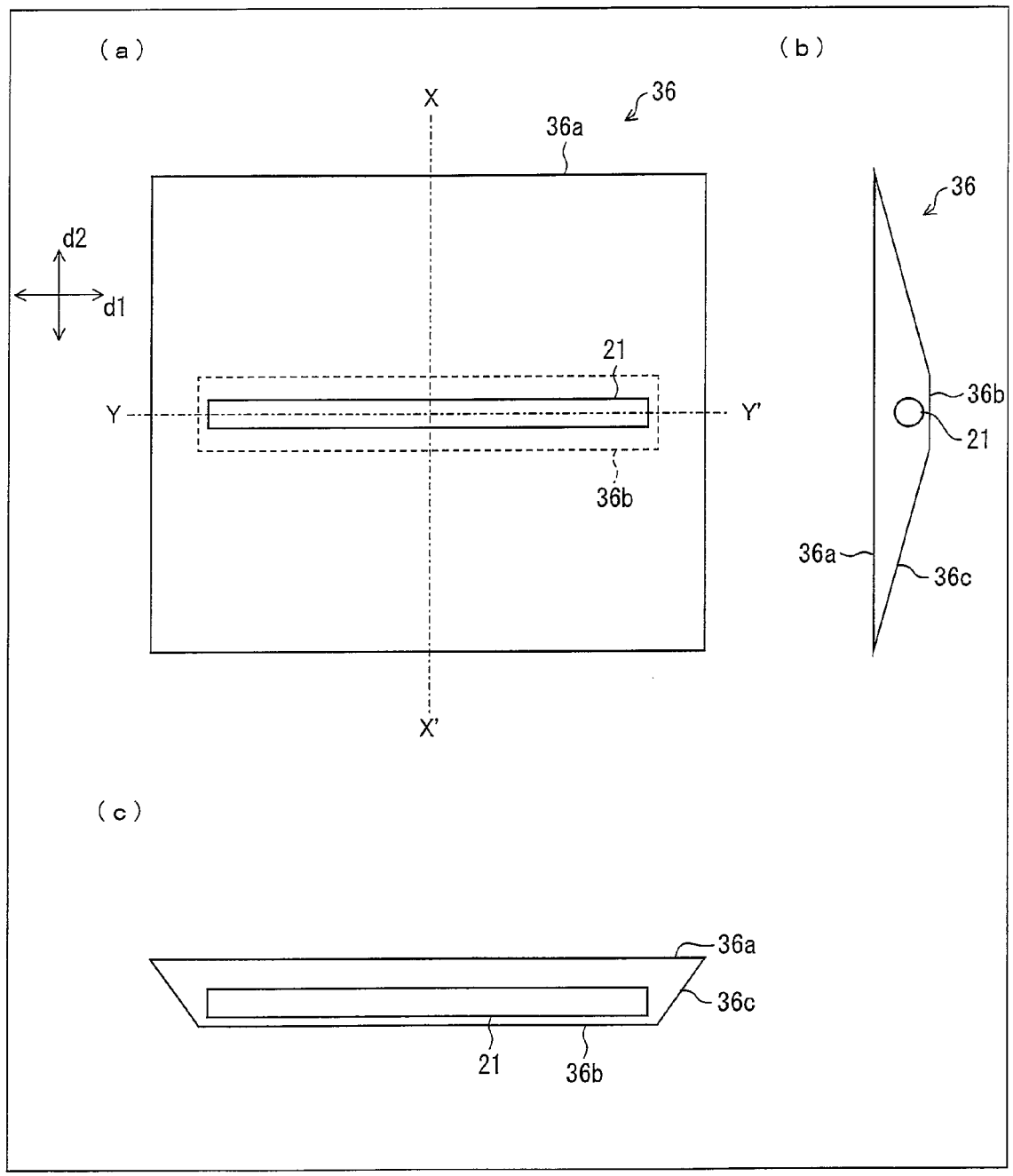

(a) of FIG. 12 is a drawing schematically showing a partial configuration of a backlight included in a liquid crystal display device in accordance with Embodiment 2, showing a positional relationship between a hot-cathode tube and a case. (b) of FIG. 12 is a cross sectional drawing showing a partial configuration of the backlight included in the liquid crystal display device in accordance with Embodiment 2, taken along a line X-X' of (a) of FIG. 12. (c) of FIG. 12 is a cross sectional drawing showing a partial configuration of the backlight included in the liquid crystal display device in accordance with Embodiment 2, taken along a line Y-Y' of (a) of FIG. 12.

Figure 13:
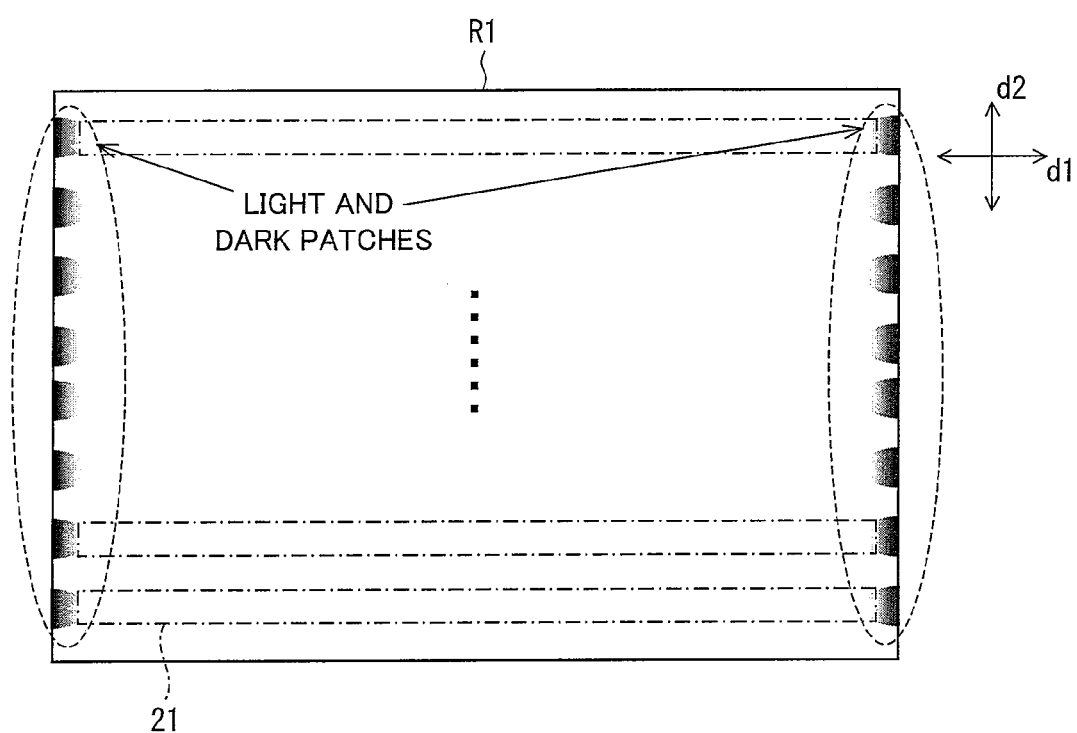

FIG. 13 is a plane drawing showing light and dark patches appearing on both ends of a display region of a liquid crystal display panel.

Figure 14:
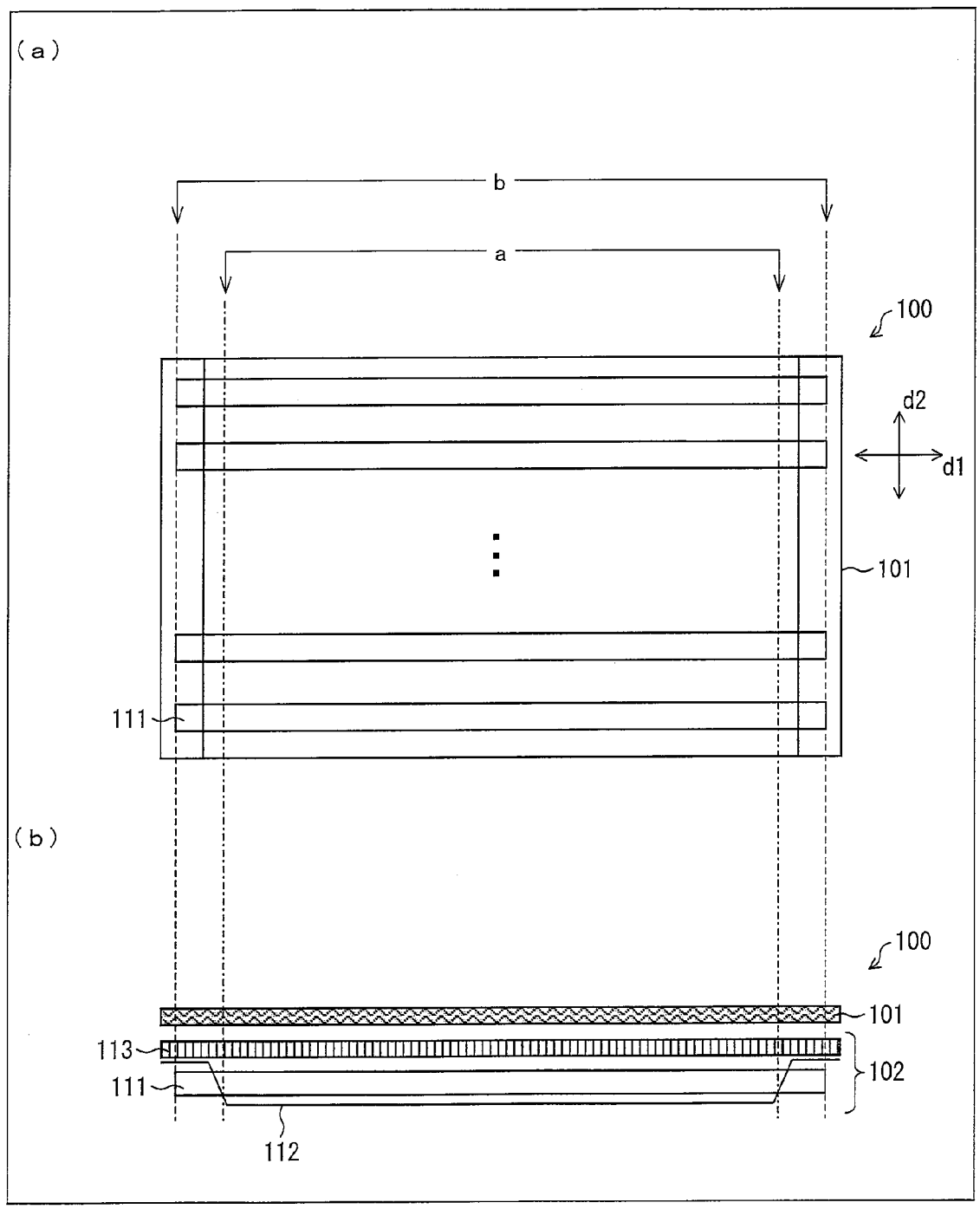

(a) of FIG. 14 is a plane drawing schematically showing a configuration of a conventional liquid crystal display device.

(b) of FIG. 14 is a cross sectional drawing showing a configuration of the conventional liquid crystal display device.

DESCRIPTION OF EMBODIMENTS

Embodiment 1

An Embodiment 1 of the present invention will be explained below with reference to FIGS. 1-11. It should be noted that the present invention is not limited to this embodiment.

In the present embodiment, an explanation will be made as to a liquid crystal display panel and a liquid crystal display device in which light is radiated to the liquid crystal display panel. The liquid crystal display device in accordance with the present embodiment is designed such that power consumption of the device as a whole is reduced by subduing power consumption of a light source used as a backlight.

FIG. 2 is a cross sectional drawing schematically showing a configuration of a liquid crystal display device 10 in accordance with the present embodiment. FIG. 2 shows a cross sectional configuration of a display region R1 of the liquid crystal display device 10 taken along the line X-X' of FIG. 1. The liquid crystal display device 10 includes a liquid crystal display panel 11 and a backlight 12, positioned to face the liquid crystal display panel 11, for radiating light to the liquid crystal display panel 11.

The liquid crystal display panel 11 is a normal liquid crystal display panel used in a conventional liquid crystal display device. Although not shown, the liquid crystal display panel 11 includes an active matrix substrate on which a plurality of TFTs (thin film transistors) are provided and a CF substrate facing the active matrix substrate, and a liquid crystal layer is sealed between the active matrix substrate and the CF substrate by a sealing member.

Normally, on a region surrounding the liquid crystal display panel 11, a driving circuit for driving TFTs etc. provided on the substrate and other components are provided, and the region does not display an image. Such region is referred to as a peripheral region (or frame region) of the liquid crystal display panel 11. A region which is positioned inside the peripheral region and which displays an image is referred to as a display region R1 (or effective display region R1).

The following details a configuration of the backlight 12 included in the liquid crystal display device 10.

The backlight 12 is positioned behind the liquid crystal display panel 11 (positioned oppositely to an image-display plane of the liquid crystal display panel 11). As shown in FIG. 2, the backlight 12 includes a hot-cathode tube (linear light source) 21, a reflective sheet (reflective plate) 22, a diffusing plate 23, a transmittance changing sheet (transmittance changing section) 24, an optical sheet 25, and a case 26.

The hot-cathode tube 21 is a light source for the backlight 12. In the present embodiment, one hot-cathode tube 21 is positioned at substantially the center of an up-down direction d2 of a display region R of the liquid crystal display panel 11 in such a manner that a long side direction of the hot-cathode tube 21 is along a lateral direction d1 of the display region R. Here, the lateral direction d1 of the display region R1 indicates a lateral direction (horizontal direction) when a viewer observes the liquid crystal display device 10 from a plane where an image is displayed, and the up-down direction d2 indicates an up-down direction (vertical direction) when the viewer observes the liquid crystal display device 10 from the plane where an image is displayed (see FIG. 1). Further, the hot-cathode tube 21 is positioned in such a manner as to cross a center line C of the up-down direction d2 of the display region R1.

In the present embodiment, a hot-cathode tube is used as a light source. However, the light source of the present embodiment is not limited to the hot-cathode tube as long as the light source is a tubular light source normally used as a linear light source. Examples of the linear light source include a hot-cathode tube (HCFL: hot cathode fluorescent lamp), a cold-cathode tube (CCFL: cold cathode fluorescent lamp), and an external electrode tube (EEFL: external electrode fluorescent lamp). Since the hot-cathode tube exhibits higher luminance with respect to power consumption than the cold-cathode tube and the external electrode tube, it is preferable to use the hot-cathode tube when the linear light source is used in an environment-friendly liquid crystal display device.

The reflective sheet 22 is positioned at the back face of the hot-cathode tube 21 (positioned oppositely to a side of the hot-cathode tube 21 which side faces the liquid crystal display panel 11). The reflective sheet 22 is used for reflecting light from the hot-cathode tube 21 so that more amount of light is directed toward the liquid crystal display panel 11.

In the present embodiment, the reflective sheet 22 is positioned at the bottom of the case 26 and the hot-cathode tube 21 is positioned on the reflective sheet 22.

The diffusing plate 23 is positioned between the liquid crystal display panel 11 and the hot-cathode tube 21, and diffuses light from the hot-cathode tube 21 so that the light is directed toward the liquid crystal display panel 11. The back face of the diffusing plate 23 (the side facing the hot-cathode tube 21) has been subjected to a diffusing treatment. In the present embodiment, as mentioned later, individual portions of the back face of the diffusing plate 23 have been subjected to the diffusing treatment such that the individual portions have different diffusibilities.

The transmittance changing sheet 24 is positioned on the diffusing plate 23 and changes transmittance of light incident to the transmittance changing sheet 24 according to a portion where the light is incident.

The optical sheet 25 is positioned on the transmittance changing sheet 24. The optical sheet 25 consists of a plurality of laminated sheets, and uniforms and collects light from the hot-cathode tube 21 and emits the light to the liquid crystal display panel 11. The optical sheet 25 is made by appropriately combining: a diffusing sheet which converges and diffuses light; a lens sheet which converges light so as to increase luminance in a front direction (direction toward the liquid crystal display panel 11); a polarizing reflective sheet which reflects one polarization component of light and transmits the other polarization component of the light so as to increase luminance of the liquid crystal display device 10. In the present embodiment, the diffusing plate 23, the transmittance changing sheet 24, and the optical sheet 25 are positioned in this order on the case 26 where the hot-cathode tube 21 is provided. It should be noted that this configuration is only an example of the present invention and the present invention is not necessarily limited to this configuration.

The following explains a positional relationship between the display region R1 of the liquid crystal display panel 11 and the hot-cathode tube 21 serving as a linear light source in the liquid crystal display device 10 in accordance with the present embodiment.

Figure 1:
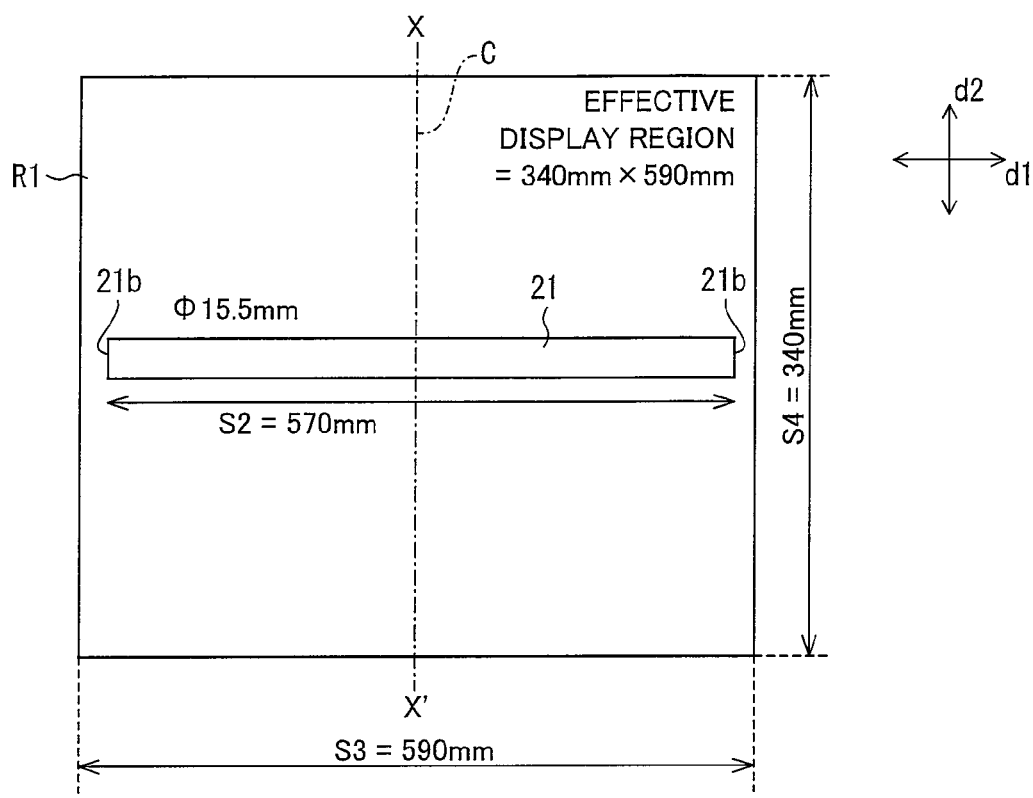
FIG. 1 is a drawing schematically showing a positional relationship between a display region and a hot-cathode tube in a liquid crystal display device shown in FIG. 2.

FIG. 1 schematically shows the positional relationship between the display region R1 of the liquid crystal display panel 11 and the hot-cathode tube 21. FIG. 1 also shows an example of dimensions of the display region R1 and the hot-cathode tube 21 in a case where the liquid crystal display device 10 is a 26-inch display.

As shown in FIG. 1, in the case where the liquid crystal display device 10 is a 26-inch display, the dimensions of the display region R1 of the liquid crystal display panel 11 are 590 mm (lateral width (S3))×340 mm (longitudinal width (S4)). The pipe diameter of the hot-cathode tube 21 used here is Φ=15.5 mm for example, and the thickness S1 of the case 26 (see FIG. 2) is 20 mm for example.

Comparison of the liquid crystal display device 10 shown in FIG. 1 in accordance with the present embodiment and the conventional liquid crystal display device 100 shown in (a) of FIG. 14 shows that, in the conventional liquid crystal display device 100, an end of the cold-cathode tube 111 serving as a linear light source is positioned outside of the display region with the width a, whereas in the liquid crystal display device 10 in accordance with the present embodiment, the length S2 in a long side direction of the hot-cathode tube 21 is shorter than the lateral width S3 of the display region R1. Further, both ends 21b of the outer shape of the hot-cathode tube 21 are positioned to be inside the display region R1 when seen from an image-display plane of the liquid crystal display device 10.

Figure 3:
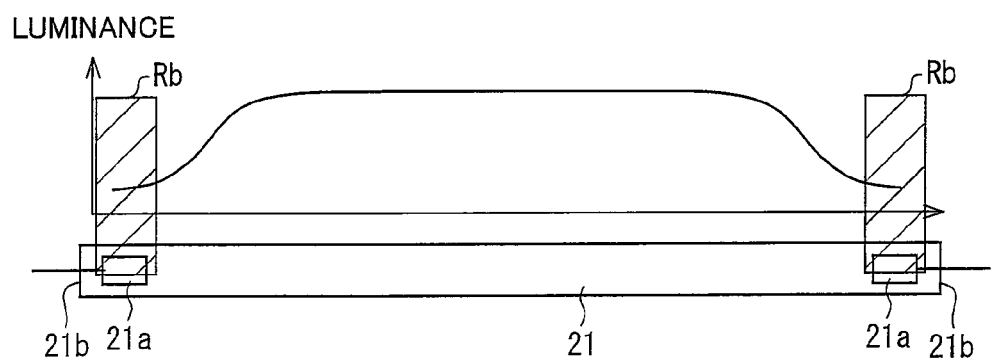
FIG. 3 is a drawing schematically showing a configuration of a tubular light source and a change in luminance of the tubular light source in a long side direction.

As shown in FIG. 3, a hot-cathode tube and the tubular light source 21 such as a hot-cathode tube have electrodes 21a for discharge at both ends of the light source 21, and portions where the electrodes 21a are positioned are non-light-emitting regions Rb. Here, both ends of the outer shape of a linear light source indicate ends of a linear light source consisting of an effective light-emitting region Ra (not shown) of the light source and the non-light-emitting regions Rb positioned at both sides of the effective light-emitting region Ra.

The following more specifically describes an example of the above configuration. In a case where a linear light source is used in a liquid crystal display device with the size (pipe diameter Φ=15.5 mm) shown in FIG. 1, if a tube current is 140 mA, the tube length of a hot-cathode tube normally used in the conventional configuration is, for example, 595 mm which is longer than the lateral width S3. In contrast thereto, in the present embodiment, the pipe length of the hot-cathode tube is 570 mm (S2). A tube voltage for the tube length 595 mm is 100 V, whereas a tube voltage for the tube length 570 mm is 95 V. This allows reducing tube power by 5%.

(Light and Dark Patches Appearing at Ends of Display Region)

If the hot-cathode tube is designed to have a shortened tube length and position its ends inside the display region as above, it is possible to reduce power consumption, but at the same time light and dark patches appear at the ends of the display region. This is explained below.

As described above, a hot-cathode tube and the tubular light source 21 such as a hot-cathode tube have electrodes 21a for discharge at both ends of the light source 21, and portions where the electrodes 21a are positioned are non-light-emitting regions Rb (see FIG. 3). In reality, since a fluorescent material is applied also on pipe walls near the ends 21b where the electrodes 21a are provided, the non-light-emitting regions Rb emit a little amount of light. However, the luminance of the light emitted by the non-light-emitting regions Rb is small compared with light emitted by the center portion of the hot-cathode tube, resulting in luminance distribution shown in FIG. 3.

If such non-light-emitting regions Rb are positioned inside the display region R1, light and dark patches appear at both ends of the display region R1 in the lateral direction d1. In FIG. 13, positions where the hot-cathode tubes 21 are provided when viewed from the image-display plane of the liquid crystal display device 10 are shown by dashed lines. Further, in FIG. 13, light and dark patches appearing at the ends of the display region R1 are shown in such a manner that a light patch is shown to be whitish and a dark patch is shown with shadow.

As described above, when the hot-cathode tube 21 whose pipe length is shorter than the width of the display region R1 is positioned to be along the lateral direction d1 of the display region R1, light and dark patches appear on both ends of the display region in the lateral direction d1. FIG. 13 shows a configuration in which a plurality of hot-cathode tubes 21 are provided. The same problem occurs in a configuration in which only one hot-cathode tube 21 is provided as shown in FIG. 1(c).

(Configuration of Transmittance Changing Sheet for Reducing Light and Dark Patches)

In order to prevent appearance of such light and dark patches, the backlight 12 in accordance with the present embodiment includes, between the hot-cathode tube 21 and the liquid crystal display panel 11, the transmittance changing sheet 24 for changing transmittance of incident light according to a position where the light is incident.

The following explains in what manner transmittance of the transmittance changing sheet 24 should be changed according to a position where light is incident.

(c) of FIG. 4 shows a positional relationship between the display region R1 and the hot-cathode tube 21 in the liquid crystal display device 10. In (c) of FIG. 4, the left drawing is a plane drawing and the right drawing is a cross sectional drawing showing a cross section taken along the line A-A' of the plane drawing. (a) of FIG. 4 shows a change in luminance of light emitted from the hot-cathode tube 21 taken along the line B-B' of (c) of FIG. 4, and (b) of FIG. 4 shows a change in luminance of light emitted from the hot-cathode tube 21 taken along the line A-A' of (c) of FIG. 4.

As shown in these drawings, luminance of light at individual portions of the display region R1 is reduced as the portions are farer from the hot-cathode tube 21 both in the lateral direction d1 and the up-down direction d2.

In consideration of this, transmittance of individual areas of the transmittance changing sheet 24 is set according to a distance between the areas and the hot-cathode tube 21. That is, the transmittance changing sheet 24 is designed such that transmittance thereof increases as the distance between the transmittance changing sheet 24 and the hot-cathode tube is larger.

FIG. 5 shows an example of a change in transmittance of the transmittance changing sheet 24 taken along the line A-A' of (c) of FIG. 4. FIG. 6 shows an example of a change in transmittance of the transmittance changing sheet 24 taken along the line B-B' of (c) of FIG. 4. These examples show in what manner transmittance should be changed at the cross section taken along the line A-A' or the line B-B' of the transmittance changing sheet 24 positioned to correspond to the display region R1.

In a normal backlight, a light source is provided under a diffusing plate. Consequently, luminance on the diffusing plate is such that luminance on a portion right above the light source is higher as the portion is above a portion of the light source with higher luminance, and luminance on a portion other than the portion right above the light source is lower as the other portion is farer from the light source. Such difference in luminance of emitted light causes luminance patches.

As described above, the transmittance changing sheet 24 in accordance with the present embodiment is designed such that luminance of the transmittance changing sheet 24 as a whole is uniformed by decreasing transmittance of a portion where luminance is high and increasing transmittance of a portion where luminance is low. Normally, in a case of a linear light source, a fluorescent material is uniformly applied to portions other than portions near electrodes at both ends of the linear light source, and so luminance patches hardly appear. Therefore, in a conventional backlight as shown in FIG. 14, a pattern of change in transmittance is only required to be such that transmittance changes only in the up-down direction d2 of the display region R1 in such a manner that transmittance at a portion right above the light source is smallest and transmittance at a portion farer in the up-down direction d2 from the portion right above the light source is higher.

In the present embodiment, in addition to the change in transmittance as above, light and dark patches appear also at both ends of the display region R1 as shown in FIG. 13. Accordingly, the intensity pattern of transmittance is also added to the transmittance changing sheet 24 in the lateral direction d1 of the display region R1 in the same concept as above. The intensity pattern of transmittance in the lateral direction d1 of the display region R1 should be set in the same manner as above, i.e. in such a manner that transmittance at a portion is lower as the portion is farer from a portion right above a light source. Therefore, the intensity pattern of transmittance in the lateral direction d1 of the display region R1 may be a pattern similar to that in the up-down direction d2, although the two patterns have different directions and different changing ratios.

Control of transmittance in the transmittance changing sheet may be made in a conventional method. To be specific, control of transmittance may be made in such a manner that a whitish coating material is printed on a front or back face of the sheet and the area of a portion where the coating material is printed is changed, or nanobubbles are formed inside the sheet and density of the nanobubbles is changed according to a portion where the nanobubbles are provided.

(Configuration of Diffusing Plate for Reducing Light and Dark Patches)

Further, in order to prevent appearance of light and dark patches as above, in the backlight 12 in accordance with the present embodiment, the diffusing plate 23 has been subjected to a diffusing treatment as follows.

FIG. 7 schematically shows a diffusing treatment to which the back face of the diffusing plate 23 (the surface facing the hot-cathode tube 21) has been subjected. In the example shown in FIG. 7, the diffusing treatment is printing of a whitish diffusing material 23*a* on the back face of the diffusing plate 23.

The diffusing treatment to which the diffusing plate has been subjected is based on a technique that at a portion with high luminance (i.e. a portion near the hot-cathode tube 21), more amount of light is made to be diffused and reflected on the back face of a diffusing plate so as to reduce transmittance.

Therefore, on a portion where light has high luminance (i.e. a portion near the hot-cathode tube 21), more amount of the whitish diffusing material is printed so as to increase diffusibility, so that more amount of light is diffused and reflected to return to the lamp again without being transmitted by the diffusing plate. On the other hand, on a portion where light has low luminance (i.e. a portion far from the hot-cathode tube 21), less amount of the diffusing material is printed so as to uniform luminance. In this case, in addition to diffusing reflection, a grayish component for absorbing light may be added to the material to be printed on the diffusing plate. In this case, a diffusing material including the grayish component may be mixed with a diffusing material including a whitish component and the mixture may be printed. An example of the grayish component is a mixture of a whitish component with a carbon material. The grayish material serves as means for decreasing luminance to some extent when luminance of light source is too high for example.

FIG. 8 schematically shows a relationship between an amount of the diffusing material 23*a* applied on the back face of the diffusing plate 23 and a manner in which light from the hot-cathode tube 21 travels. As shown in the drawing, on a portion right above the hot-cathode tube 21, there exists a more amount of the diffusing material 23*a* than on other portions, and consequently much of light from the hot-cathode tube 21 is diffused and reflected. In contrast thereto, on portions farer from the hot-cathode tube 21, there exists a less amount of the diffusing material 23*a* than on the portion right above the hot-cathode tube 21, and consequently much of light from the hot-cathode tube 21 is transmitted by the portions.

Further, control of diffusibility can be made by varying proportion of area occupied by the diffusing material according to where the place is positioned. For example, increasing the proportion of area occupied by the diffusing material allows increasing diffusibility. The proportion of area occupied by the diffusing material may be changed by varying the pitch for positioning the diffusing material while maintaining the same dot size or may be changed by varying the dot size and thus varying proportion of area occupied by dots.

In the example shown in FIG. 7, dot size is varied so as to control diffusibility. In FIG. 7, the position where the hot-cathode tube 21 is provided is shown by a broken line. As shown in the drawing, the diffusing treatment is made in such a manner that a portion farer from the hot-cathode tube 21 has lower diffusibility.

In particular, in the present embodiment, since the ends 21*b* of the hot-cathode tube 21 are positioned inside the display region R1, light and dark patches appear at ends of the display region R1 in the lateral direction d1. In order to deal with this problem, as shown in FIG. 7, a portion of the back face of the diffusing plate 23 which portion faces ends of the hot-cathode tube 21 and their neighbors has been subjected to the diffusing treatment in such a manner that the portion has lower diffusibility than a portion of the diffusing plate 23 which portion faces the middle of the hot-cathode tube 21. This allows reducing light and dark patches appearing on the ends of the display region R1 in the lateral direction d1.

Other examples of the diffusing treatment include a treatment for making minute concavities and convexities (grain finish) and a prism treatment.

(Configuration of Reflective Sheet for Reducing Light and Dark Patches)

Further, in order to prevent appearance of light and dark patches as above, in the backlight 12 in accordance with the present embodiment, the reflective sheet 22 has been subjected to the diffusing treatment as follows.

FIG. 9 schematically shows a diffusing treatment made on a surface of the reflective sheet 22 which surface faces the hot-cathode tube 21 (this surface is hereinafter referred to as a front face of the reflective sheet 22). In the example shown in FIG. 9, the diffusing treatment is printing of a whitish diffusing material 22*a* on the front face of the reflective sheet 22. The diffusing treatment may be made by printing a diffusing material on the surface facing the hot-cathode tube 21, as in the case of the diffusing treatment made on the diffusing plate 23.

Normally, the reflective sheet 22 is positioned right below the linear light source 21. Consequently, when the front face of the reflective sheet 22 has not been subjected to the diffusing treatment, luminance patches on the diffusing plate 23 are caused not only by light directly traveling from the linear light source 21 but also by light emitted from the linear light source 21 to the reflective sheet 22 and then reflected by the reflective sheet 22. As a result, as shown in (a) of FIG. 10, there appears a bright line whose width is larger than the width of the linear light source 21.

In order to deal with this problem, the diffusing material 22a is formed on the front face of the reflective sheet 22 according to the degree of luminance, as in the case of the back face of the diffusing plate 23. This narrows the width of the bright line as shown in (b) of FIG. 10. In (a) and (b) of FIG. 10, traveling of light from the light source is indicated by arrows.

In the example of the diffusing treatment shown in FIG. 9, the diffusing material 22a is formed on a position corresponding to a position where the hot-cathode tube 21 is provided and its neighbors. In FIG. 9, the position where the hot-cathode tube 21 is provided is indicated by a broken line.

In the backlight 12 in accordance with the present embodiment, as shown in FIG. 11, there exists no light source at a region (region Rc) ranging from the ends 21b of the hot-cathode tube 21 to the boarder between the display region R1 and the peripheral region R2. Consequently, as shown in the graph of FIG. 11, luminance at the region Rc is very low. Applying the diffusing material 22a on a region with no luminance is not preferable. However, in reality, due to diffraction of light etc., luminance at the region Rc is higher than zero.

Accordingly, if the region Rc is designed to have no diffusing material 22a thereon, there is a possibility that a boarder line appears due to presence/absence of the diffusing material 22a. In order to deal with this problem, it is preferable to gradually reduce the diffusing material according to a change in the level of luminance on the display region R1. This allows diffusibility of light on a surface of the reflective sheet 22 which surface faces the end 21b of the hot-cathode tube 21 to be smaller than diffusibility of light on a surface of the reflective sheet 22 which surface faces the center portion of the hot-cathode tube 21. This allows reducing light and dark patches on the ends of the display region R1 in the lateral direction d1.

In this regard, the reflective sheet 22 shown in FIG. 9 has been subjected to the diffusing treatment in such a manner that diffusibility of light on a surface of the reflective sheet 22 which surface faces the ends 21b of the hot-cathode tube 21 and their neighbors to be smaller than diffusibility of light on a surface of the reflective sheet 22 which surface faces the center portion of the hot-cathode tube 21. This allows reducing light and dark patches on the ends of the display region R1 in the lateral direction d1.

As described above, in the liquid crystal display device in accordance with the present embodiment, the length S2 of the hot-cathode tube 21 is set such that the ends of the hot-cathode tube 21 are inside the display region R1, so that the length of the light source is shorter than the length of a conventional light source. Shorter length of the hot-cathode tube 21 realizes a reduced tube voltage while keeping the same tube current, thereby reducing power consumption of the light source.

In particular, the liquid crystal display device in accordance with the present embodiment is preferably used as an environment-friendly display device. In the environment-friendly display device, the number of linear light sources is reduced in order to subdue power consumption of a backlight. Further, a distance between the linear light source and the liquid crystal display panel is made larger than that in a backlight of a conventional liquid crystal display device in order to improve luminance patches caused by the reduction in the number of the linear light sources. Securing a large distance between the light source and the liquid crystal display panel as above allows subduing luminance patches caused by shortening the length of the linear light source.

In the present Embodiment 1, as a configuration for reducing light and dark patches appearing at positions corresponding to ends of a linear light source and their neighbors and for uniforming luminance, an explanation was made as to an example including all of the three configurations: (1) a configuration in which a transmittance changing sheet is provided, (2) a configuration in which a diffusing plate has been subjected to a diffusing treatment, and (3) a configuration in which a reflective plate has been subjected to a diffusing treatment. However, the present invention is not limited to this example including all of the three configurations (1)-(3). That is, only one of the configurations (1)-(3) or a combination of only two of the configurations (1)-(3) is also encompassed in the present invention.

In the above embodiment, an explanation was made as to a case where a liquid crystal display device includes one linear light source in one backlight. However, the present invention is not limited to this case. If the liquid crystal display device includes a plurality of linear light sources in one backlight, the light sources should be positioned to be parallel to each other and to be along a longitudinal or lateral direction of a liquid crystal display panel in such a manner that ends of each light source is inside a display region of the liquid crystal display panel. For the purpose of reducing power consumption, the number of linear light sources is preferably one or two with respect to each backlight.

In the above embodiment, an explanation was made as to a case where linear light sources are positioned to be along a lateral direction of the display region of the liquid crystal display panel. However, the present invention is not limited to this case. That is, a configuration in which linear light sources are positioned to be along an up-down direction of the display region of the liquid crystal display panel is also encompassed in the present invention.

Embodiment 2

The following explains Embodiment 2 of the present invention. In the present embodiment, only a configuration different from that of Embodiment 1 will be explained.

A liquid crystal display device 10 in accordance with the present embodiment has substantially the same configuration as the liquid crystal display device 10 whose cross sectional configuration is shown in FIG. 2, except that a case (containing section) of the liquid crystal display device 10 in accordance with the present embodiment is different from the case 26 shown in FIG. 2.

(a), (b), and (c) of FIG. 12 show a configuration of a case (containing section) 36 and the hot-cathode tube 21 included in the liquid crystal display device 10 in accordance with the present embodiment. (a) of FIG. 12 is a drawing schematically showing a positional relationship between the hot-cathode tube 21 and the case 36. This drawing shows a plane configuration of the case 36 and the hot-cathode tube 21 seen from the liquid crystal display panel 11. (b) of FIG. 12 is a cross sectional drawing showing the configuration of the case 36 and the hot-cathode tube 21 taken along the line X-X' of (a) of FIG. 12. (c) of FIG. 12 is a cross sectional drawing showing the configuration of the case 36 and the hot-cathode tube 21 taken along the line Y-Y' of (a) of FIG. 12.

In (a) of FIG. 12, the frame of the case 36 serves as a facing surface 36a which faces the diffusing plate 23 (the facing surface 36a is a surface which faces the liquid crystal display panel 11 via plate-shaped members such as a diffusing plate and an optical sheet). Further, a bottom surface 36b (light-source-provided surface) of the case 36 is shown by a broken line.

In (a) of FIG. 12, although a display region R1 of the liquid crystal display panel 11 is not shown, the liquid crystal display device 10 of the present embodiment is designed such that a length S2 of the hot-cathode tube 21 in a long side direction is shorter than a lateral width S3 of the display region R1, as with the configuration of Embodiment 1. Further, the ends 21b of the outer shape of the hot-cathode tube 21 are positioned inside the display region R1 when seen from an image-display-plane of the liquid crystal display device 10.

Further, as shown in (a) of FIG. 12, the size of the bottom surface 36b of the case 36 is determined in accordance with the outer shape of the hot-cathode tube 21, and the size of the facing surface 36a of the case 36 is determined in accordance with the outer shape of the liquid crystal display panel 11.

Here, "the size of the bottom surface 36b of the case 36 is determined in accordance with the outer shape of the hot-cathode tube 21" indicates that the size of the bottom surface 36b is determined such that the size provides a space which is sufficiently wide for the hot-cathode tube 21 to be positioned there and which is not excessively wider than the outer shape of the hot-cathode tube 21. Further, "the size of the facing surface 36a of the case 36 is determined in accordance with the outer shape of the liquid crystal display panel 11" indicates that the case 36 has substantially the same shape at the facing surface 36a as the liquid crystal display panel 11.

As shown in (b) and (c) of FIG. 12, a side face 36c of the case 36 is inclined with respect to the bottom surface 36b and the facing surface 36a. That is, as shown in (b) and (c) of FIG. 12, the cross section of the case 36 is a trapezoid.

With the arrangement, the bottom surface 36b of the case 36 where the hot-cathode tube 21 is positioned is shaped to be in accordance with the outer shape of the hot-cathode tube 21 and the side face 36c is inclined from the bottom surface 36b to the facing surface 36a. This allows increasing a diffusing function and a reflective function in the case, thereby increasing luminance of the backlight 12. Further, on a surface inside the case 36 where the hot-cathode tube 21 is positioned, a reflective sheet may be attached or a reflective material may be applied in order to further increase the reflective function.

Also in the liquid crystal display device 10 in accordance with the present embodiment, the transmittance changing sheet 24 with transmittance distribution as explained in Embodiment 1 and the diffusing plate 23 and the reflective sheet 22 each having been subjected to the diffusing treatment as explained in Embodiment 1 may be provided. Alternatively, the transmittance changing sheet as explained in Embodiment 1 may not be provided or a diffusing plate and a reflective sheet each having not been subjected to the diffusing treatment as explained in Embodiment 1 may be provided.

The present invention is not limited to the description of the embodiments above, but may be altered by a skilled person within the scope of the claims. An embodiment based on a proper combination of technical means disclosed in different embodiments is encompassed in the technical scope of the present invention.

As described above, the backlight included in the liquid crystal display device of the present invention includes a linear light source, and ends of an outer shape of the linear light source being positioned inside a display region of the liquid crystal display panel when the liquid crystal display device is seen from a side where an image is displayed, and the linear light source being positioned to cross at least one of a center line of the display region in a longitudinal direction and a center line of the display region in a horizontal direction.

With the arrangement, it is possible to realize a liquid crystal display device with reduced power consumption without decreasing luminance of an illuminating device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A liquid crystal display device of the present invention realizes reduced power consumption without reducing luminance of a backlight. Accordingly, the liquid crystal display device of the present invention may be preferably used as an environment-friendly display device.

REFERENCE SIGNS LIST

10: liquid crystal display device
11: liquid crystal display panel
12: backlight
21: hot-cathode tube (linear light source)
21b: end (of a linear light source)
22: reflective sheet (reflective plate)
23: diffusing plate
24: transmittance changing sheet (transmittance changing section)
25: optical sheet
26: case
36: case (containing section)
36a: facing surface (which faces liquid crystal display panel of containing section)
36b: bottom surface (light-source-provided surface) (of containing section)
36c: side face (of containing section)
R1: display region (of liquid crystal display panel)
R2: peripheral region (of liquid crystal display panel)
Ra: effective light-emitting region (of linear light source)
Rb: non-light-emitting region (of linear light source)
d1: lateral direction (horizontal direction) (of display region)
d2: up-down direction (longitudinal direction) (of display region)

The invention claimed is:

1. A liquid crystal display device, comprising a liquid crystal display panel and a backlight arranged light to the liquid crystal display panel, wherein
the backlight includes a linear light source and a transmittance changing section that is provided between the liquid crystal display panel and the linear light source and arranged to change transmittance of incident light according to where the light is incident;
ends of an outer shape of the linear light source are positioned inside a display region of the liquid crystal display panel when the liquid crystal display device is seen from a side where an image is displayed, and the linear light source is positioned to cross at least one of a center line of the display region in a longitudinal direction and a center line of the display region in a horizontal direction;

the transmittance changing section is designed such that the transmittance increases as a distance between the transmittance changing section and the linear light source increases; and the transmittance changing section is further designed such that an area positioned outside of the ends of the outer shape of the linear light source in a long side direction has a higher transmittance than an area where the linear light source is positioned.

2. The liquid crystal display device as set forth in claim 1, wherein the backlight includes a diffusing plate, provided between the liquid crystal display panel and the linear light source, for diffusing light, a face of the diffusing plate which face faces the linear light source has been subjected to a diffusing treatment for diffusing light, and the face of the diffusing plate has been subjected to the diffusing treatment in such a manner that a portion of the face which portion faces the ends of the linear light source has lower diffusibility than a portion of the face which portion faces a center portion of the linear light source.

3. The liquid crystal display device as set forth in claim 1, wherein the backlight includes a reflective plate, provided at a back face of the linear light source, for reflecting light, a face of the reflective plate which face faces the linear light source has been subjected to a diffusing treatment for diffusing light, the face of the reflective plate has been subjected to the diffusing treatment in such a manner that a portion of the face which portion faces the ends of the linear light source has lower diffusibility than a portion of the face which portion faces a center portion of the linear light source.

4. The liquid crystal display device as set forth in claim 2, wherein the diffusing treatment is printing of a diffusing material on the face facing the linear light source.

5. The liquid crystal display device as set forth in claim 1, wherein the backlight includes a containing section arranged to contain the linear light source; and a size of a face of the containing section on which face a light source is provided is determined in accordance the outer shape of the linear light source, a size of a face of the containing section which face faces the liquid crystal display panel is determined in accordance with an outer shape of the liquid crystal display panel, and a side face of the containing section which side face is positioned between the face on which the light source is provided and the face facing the liquid crystal display panel is inclined with respect to the face on which the light source is provided and the face facing the liquid crystal display panel.

6. The liquid crystal display device as set forth in claim 1, wherein the linear light source is a hot-cathode tube.

7. The liquid crystal display device as set forth in claim 3, wherein the diffusing treatment is printing of a diffusing material on the face facing the linear light source.

* * * * *